(12) United States Patent
Schumann et al.

(10) Patent No.: US 8,470,928 B2
(45) Date of Patent: Jun. 25, 2013

(54) ADHESIVES WITH ACOUSTIC DAMPING EFFECT

(75) Inventors: Manfred Schumann, Heidelberg (DE); Kersten Kreiner, Sandhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/291,418

(22) Filed: Nov. 8, 2011

(65) Prior Publication Data

US 2012/0115998 A1    May 10, 2012

Related U.S. Application Data

(63) Continuation of application No. PCT/EP2009/066319, filed on Dec. 3, 2009.

(30) Foreign Application Priority Data

May 11, 2009 (DE) .......................... 10 2009 002 996

(51) Int. Cl.
*C08L 53/02* (2006.01)

(52) U.S. Cl.
USPC ............... 525/88; 525/92 C; 525/98; 524/589

(58) Field of Classification Search
USPC .................. 525/88, 92 C, 98; 524/589
See application file for complete search history.

(56) References Cited

U.S. PATENT DOCUMENTS

| | | | |
|---|---|---|---|
| 5,332,786 A | | 7/1994 | Nagata et al. |
| 5,633,317 A | * | 5/1997 | Kawasaki et al. ............... 525/66 |
| 6,414,073 B1 | * | 7/2002 | Nakamura et al. ............. 524/505 |
| 2004/0229990 A1 | * | 11/2004 | Righettini et al. ............. 524/445 |
| 2006/0182978 A1 | * | 8/2006 | Leroy et al. ................. 428/423.1 |

FOREIGN PATENT DOCUMENTS

| | | |
|---|---|---|
| DE | 19543192 | 5/1997 |
| DE | 19806122 | 8/1999 |
| EP | 0232055 | 8/1987 |
| EP | 0293602 | 12/1987 |
| EP | 0979835 | 8/1999 |
| JP | 2005314536 A | 11/2005 |
| WO | WO9916618 | 4/1999 |
| WO | WO 2005010116 | 2/2005 |
| WO | WO 2007039309 | 4/2007 |

OTHER PUBLICATIONS

DIN 53504:May 1994; Testing of Rubber-Determination of Tensile Strength at Break, Tensile Stress Yield, 19 pages.
DIN 53505:Jun. 1987; Testing of Rubber-Shore A and Shore D Hardness Test, 5 pages.
DIN 54457:Sep. 2007; Structural Adhesives-Testing of Adhesively Bonded Joints, 8 pages.
DIN EN 1465:Jan. 1995; Adhesives-Determination of Tensile Lap Shear Strength of Bonded Assemblies 11 pages.
DIN EN ISO 10365:1992; Adhesives-Designation of Main Failure Patterns, 6 pages.

* cited by examiner

*Primary Examiner* — Jeffrey Mullis
(74) *Attorney, Agent, or Firm* — Mary K. Cameron

(57) ABSTRACT

A one- or two-component adhesive containing: a) a binding agent having reactive isocyanate groups or silane groups, and b) a nonreactive polymer having a glass transition temperature, measured by means of DSC, in the range from −40° C. to +60° C. This preferably has, in a cured state, at a temperature at least in the range from −10 to +50° C., a dynamic mechanical loss factor tan δ of at least 0.4 at a frequency in the range from 10 to 400 Hz. Use of an adhesive of this kind for the adhesive bonding of components in the manufacture or repair of vehicles, in particular for bonding windows into place in the context of direct glass bonding.

17 Claims, 1 Drawing Sheet

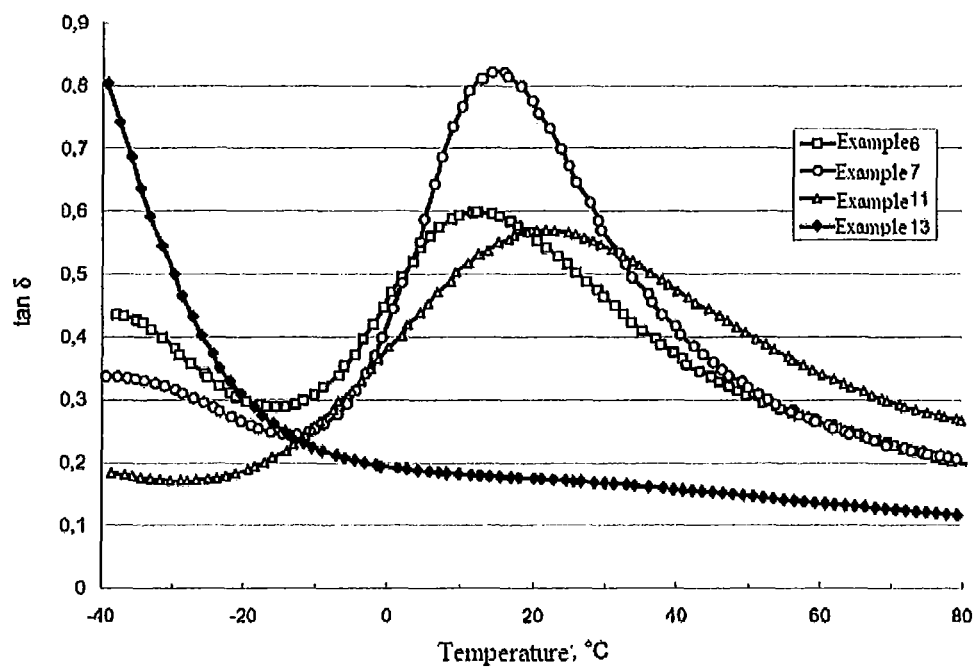

ADHESIVES WITH ACOUSTIC DAMPING EFFECT

The present invention relates to an adhesive that exhibits an acoustic damping effect, i.e. that decreases the transfer of vibrations in the audible frequency range through the adhesive layer, by the fact that it absorbs such vibrations and converts them into heat. The adhesive is suitable in particular for adhesively bonding components to one another in vehicle construction. It is particularly suitable for bonding windows, such as a windshield, rear window, fixed side windows, or the window of a vehicle roof, to the vehicle frame or to the corresponding window carrier.

Acoustically effective coatings and foams are used for vibration damping and noise damping at many locations in modern vehicles. Given the optimizations that have already been achieved, it is principally vehicle glazing that is increasingly attracting the attention of designers as one of the remaining weak points. As a result of their own vibration and the transmission of solid-borne sound, large-area windows make a not inconsiderable contribution to the noise level in the vehicle interior. For obvious reasons, conventional acoustic coatings cannot be used with them. In the case of windshields made of laminated safety glass (LSG), one approach to a solution that does exist is the use of special multi-layer PVB composite films having an excellent damping effect. The high price of such products is, however, a disadvantage. This option moreover does not exist for rear and side windows made of single-layer safety glass.

Solutions that describe vibration damping by way of the configuration of the window bonding system have therefore already been described in the patent literature. One method makes use of conventional one-component polyurethane window adhesives and achieves damping in the fashion of a mechanical shock absorber by way of the specific conformation of the adhesive bead (with a cavity, or folded) [DE 19543192]. In the absence of suitable exemplifying embodiments, however, this invention lacks functional proof. Several patent applications (e.g. DE 19806122 and WO 99/16618) propose combinations of two different products: strength-developing adhesive layers or profiles, combined with vibration-damping substances of varying consistency. The arrangement of the products next to or upon one another, and on the window edge, varies in this context. Because of the usually complex application technology, but also for lack of suitable products, none of the aforesaid developments has yet succeeded in finding a use on the market.

The use of a single adhesive that combines both good damping and sufficient mechanical strength seems advantageous [WO 2005/010116]. A material of this kind, when formulated to be pasty and pumpable, can be processed without additional investment using systems already in place at OEMs. The polyester-containing formulations presented in WO 2005/010116 have disadvantages, however, such as a lack of moist high-temperature strength and a sharp increase in modulus below room temperature. They, too, have therefore so far found no practical application.

A demand therefore exists for an adhesive that comes close to the known one-component polyurethane window adhesives in terms of its processing, strength, and adhesion properties, and its long-term stability, but additionally possesses good damping properties in the form of a high dynamic mechanical loss factor (by preference tan $\delta$>0.4, in particular >0.5).

The loss factor tan $\delta$, sometimes also referred to as "intrinsic structural damping," is the ratio between Young's loss modulus E" and Young's storage modulus E':

tan $\delta$=loss modulus $E''$/storage modulus $E'$

These values can be determined by dynamic mechanical analysis (DMA) of the material. Details are provided below in the Examples section.

WO 2007/039309 describes the use of special styrene-isoprene block copolymers (SIS) for formulating acoustically effective coatings for vehicle applications. These products, based on thermoplastic rubbers, can be crosslinked and, if applicable, expanded at elevated temperature, and are suitable for use in the basic body or in the paint line. The SIS copolymers that are used are notable for a glass transition—combined with a maximum of the loss factor tan $\delta$—in the range of room temperature.

Due to poor compatibility and a high melting temperature, however, these rubber components are difficult to incorporate into cold-hardening adhesives based on isocyanate- or silane-crosslinking polymers such as those used in final assembly and in particular for window bonding. Crosslinking of the rubber is moreover not possible.

The present invention makes available an acoustically damping adhesive that is suitable in particular for adhesive bonding of components in vehicle construction, specifically for bonding windows into place (direct glass bonding).

BRIEF DESCRIPTION OF THE DRAWINGS

FIG. 1 shows a graph of the temperature dependence of the loss factor tan $\delta$ at 400 Hz for the adhesives of Examples 6, 7, 11 (Invention), and Example 13 (Comparative). The x-axis is temperature in degrees Celsius and the y-axis is tan $\delta$.

A subject of the present invention is a one- or two-component adhesive containing a) a binding agent having reactive isocyanate groups or silane groups;

b) a nonreactive polymer having a glass transition temperature, measured by means of DSC, in the range from −40° C. to +60° C.

Component a) in this context provides the mechanical strength of the adhesive, and component b) the acoustic damping behavior.

In contrast to the cited existing art [WO 2005/010116], the damping behavior is based not on different thermoplastic chain segments having different glass transition temperatures in the binding agent, but on the addition of a separate thermoplastic component b) having a suitable glass transition temperature. The disadvantages, recited above, of the teaching of WO 2005/010116 are thereby overcome.

Details regarding binding agent a) having reactive isocyanate (NCO) terminal groups:

Depending on whether one- or two-component adhesives are being formulated, the binding agent either is present in a single preparation, or is distributed over two components in the form of different reaction partners. The term "binding agent" is used hereinafter for both adhesive types, and refers to the totality of the reactive constituents contained in the adhesive that form the polymer network upon curing.

As one skilled in the art is aware, NCO-containing prepolymers are usually used as binding agents in one-component, moisture-hardening polyurethane adhesives. These prepolymers are reaction products of compounds having more than one H-acid functional group, for example OH, SH, NH, or COOH groups, with an excess of polyisocyanates. The average molecular weight of such reaction products can be equal to from 300 g/mol to 30,000 g/mol; the NCO functionality is as a rule between 2 and 4.

Polyfunctional alcohols are used in particular to manufacture the prepolymers; these can be low-molecular-weight compounds or longer-chain, OH-functional polymers. They contain 2 to 10, in particular 2 to 4 OH groups per molecule. The OH groups can be arranged terminally or laterally. The OH groups can be primary, secondary, or tertiary, but primary or secondary OH groups are preferred. In addition to short-chain polyalcohols, examples of suitable compounds are especially polyols based on polyethers, polyesters, polyacrylates, polyalkylenes, or polyolefins, which can be liquid, amorphous, or crystalline at room temperature (22° C.).

Suitable aliphatic alcohols have a molecular weight from 60 to 600 g/mol, in particular up to approximately 400 g/mol. Linear alcohols having 2 to 30 carbon atoms, which comprise two to four OH groups, are particularly suitable.

Also suitable as a polyol component are reaction products of low-molecular-weight polyfunctional alcohols with alkylene oxides, so-called polyethers. The alkylene oxides preferably have 2 to 4 carbon atoms. Such polyols have an average molecular weight of between 200 and 20,000 g/mol, in particular between 500 and 6000 g/mol. The reaction products of ethylene glycol, propylene glycol, the isomeric butanediols, hexanediols, or 4,4'-dihydroxydiphenylpropane with ethylene oxide, propylene oxide, or butylene oxide, or mixtures thereof, are, for example, suitable. Also suitable are the reaction products of polyfunctional alcohols such as glycerol, trimethylolethane or trimethylolpropane, pentaerythritol, or sugar alcohols with the aforesaid alkylene oxides to yield polyester polyols. Further polyols suitable in the context of the invention are produced by the polymerization of tetrahydrofuran (poly-THF). Polyether polyols of this kind are known and commercially obtainable.

Polyester polyols are also suitable. Polyester polyols of this kind preferably encompass the reaction products of polyfunctional, by preference difunctional and/or trifunctional alcohols with polyfunctional, by preference difunctional and/or trifunctional carboxylic acids. Instead of free polycarboxylic acids, the corresponding polycarboxylic anhydrides, or corresponding polycarboxylic acid esters with alcohols, can be reacted. The polycarboxylic acids can be aliphatic, cycloaliphatic, aromatic, or heterocyclic. They can optionally be substituted, for example with alkyl groups, alkenyl groups, ether groups, or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, glutaric acid anhydride, maleic acid, maleic acid anhydride, fumaric acid, dimer fatty acid or trimer fatty acid, citric acid, or mixtures thereof.

Alcohols suitable for the manufacture of such polyester polyols are, in particular, hexanediol, 1,4-hydroxymethylcyclohexane, 2-methyl-1,3-propanediol, 1,4-butanediol, triethylene glycol, tetraethylene glycol, ethylene glycol, polyethylene glycol, dipropylene glycol, polypropylene glycol, dibutylene glycol, and polybutylene glycol. The reaction conditions between the alcohol and carboxylic acids are selected so that polyesters containing OH groups are obtained.

Polyester polyols of oleochemical derivation can, however, also be used. Such polyols can be manufactured, for example, by complete ring opening of epoxidized triglycerides of an at least partly olefinically unsaturated fatty-acid-containing fat mixture using one or more alcohols having 1 to 12 carbon atoms, and subsequent partial transesterification of the triglyceride derivatives to yield alkyl ester polyols having 1 to 12 carbon atoms in the alkyl residue.

OH-functional polyesters are commonly known to one skilled in the art, and are commercially obtainable. Polyester polyols containing two or three terminal OH groups are particularly suitable. These preferably have a molecular weight from approx. 200 to 10,000 g/mol, in particular from 1000 to 5000 g/mol.

A further suitable group of polyalcohols is polyurethane polyols. These are reaction products of polyisocyanates, preferably diisocyanates, with polyols, in particular diols. The polyols can be selected in this context from the aforementioned group of polyols. The quantities are selected so that terminally OH-terminated products are obtained. The functionality of the polyurethane polyols is preferably to be between 2 and 4. The molecular weight is determined by the reaction components used. OH-terminated PU polyols of this kind are likewise known to one skilled in the art.

Further suitable polyols are, for example, polycarbonate polyols, polyesters based on ε-caprolactone, and dimer diols. The hydroxyfunctional polybutadienes, such as those obtainable e.g. under the commercial name "Poly-bd," can also be used as polyols for the compositions according to the present invention. Polyacetals are likewise suitable as a polyol component. Polyacetals are, for example, reaction products of glycols, e.g. diethylene glycol or hexanediol, with formaldehyde. Polyacetals can also be obtained by the polymerization of cyclic acetals.

All monomeric di- or polyisocyanates known to one skilled in the art can be used as an isocyanate for manufacturing the polyurethane prepolymers having reactive NCO groups from the polyols described above or from other H-acid reaction partners. The isocyanates can be aromatic, aliphatic, or cycloaliphatic.

Suitable isocyanates are selected, for example, from the group of 4,4'-diphenylmethane diisocyanate (MDI), hydrogenated or partly hydrogenated MDI (H12MDI, H6MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of toluylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, tetramethoxybutane-1,4-diisocyanate, naphthalene-1,5-diisocyanate (NDI), butane-1,4-diisocyanate, hexane-1,6-diisocyanate (HDI), dicyclohexylmethane diisocyanate, tetramethylene, hexamethylene, undecane, dodecamethylene, 2,2,4-trimethylhexane-2,3,3-trimethylhexamethylene diisocyanate, cyclohexane-1,4-diisocyanate, ethylene diisocyanate, methylenetriphenyltriisocyanate (MIT), phthalic acid bisisocyanatoethyl ester, diisocyanates having reactive halogen atoms, such as 1-chloromethylphenyl-2,4-diisocyanate, 1-bromomethylphenyl-2,6-diisocyanate, 3,3-bischloromethyl ether-4,4'-diphenyldiisocyanate. Further usable diisocyanates are trimethylhexamethylene diisocyanate, 1,4-diisocyanatobutane, 1,12-diisocyanatododecane, and dimer fatty acid diisocyanate, lysine ester diisocyanate, 4,4-dicyclohexylmethane diisocyanate, 1,3-cyclohexane or 1,4-cyclohexane diisocyanate.

Suitable trifunctional isocyanates are those isocyanate that are produced by trimerization or oligomerization of diisocyanates, or by reacting diisocyanates with trifunctional hydroxyl-group-containing compounds. Examples thereof are trimerization products of the isocyanates HDI, MDI, or IPDI, or adducts of diisocyanates and low-molecular-weight triols, such as trimethylolpropane or glycerol.

Also suitable are monomeric, asymmetrical diisocyanates that possess NCO groups having a different reactivity with respect to H-acid reaction partners. Examples of aromatic diisocyanates having differently reactive NCO groups are the isomers of TDI, NDI, 1,3-phenylene diisocyanate, or 2,4-MDI. This is a way of directly obtaining prepolymers having only a small proportion of monomeric diisocyanates.

From the aforementioned polyols and polyisocyanates, the polyurethane prepolymers having reactive NCO groups, which are suitable according to the present invention as binding agent a), are manufactured using known methods. This can occur, for example, at room temperature, but elevated temperatures can also be utilized. The initial compounds generally react spontaneously with one another. It may also be necessary, however, to use catalysts such as organometallic compounds or organic amino compounds. The known methods can furthermore be used to remove unreacted polyisocyanates. These include, for example, thin-film distillation or capture of the monomeric isocyanates using low-molecular-weight reaction partners.

Two-component polyurethane adhesives are usually made up of one component that contains an NCO-containing compound, and a second component that makes an H-acid reaction partner available. The NCO-containing component can contain any of the aforesaid di- or polyisocyanates suitable for prepolymer manufacture. It can also contain one or more prepolymers such as those already described for use in one-component adhesives.

The second component contains one or more H-acid constituents. These can be, in principle, the same compounds as those used in prepolymer manufacture, i.e. in particular di- or polyfunctional alcohols, amines, mercaptans, or carboxylic acids. Longer-chain polymeric diols or polyols are usually used for this. If the first component contains an NCO-containing prepolymer, short-chain compounds such as di- or trifunctional alcohols and amines, or water, are often also used as reaction partners.

The mixing ratio of the components of a two-component system depends substantially on the NCO-containing and H-acid reaction partners that are selected, and on their molecular weight. It can vary within a range between approximately 100:1 and 1:10. For many products, one of the two components is used in excess. It is, however, certainly also possible for one skilled in the art to formulate adhesives having a mixing ratio of 1:1. Such products are likewise usual on the market.

Details regarding binding agents a) having reactive silane groups:

Polymers that possess reactive silyl groups and can be used as binding agent a) in the context of the present invention are known. These silane-crosslinking polymers generally comprise an organic backbone that carries at the ends, for example alkoxy- or acyloxysilyl groups. Polymers of this kind that possess silyl groups having hydrolyzable substituents are already capable, at room temperature, of being condensed with one another in the presence of atmospheric moisture.

The following can be used, for example, in the context of the present invention: an alkoxy- and/or acyloxysilane-terminated polymer having at least one terminal group of the general formula (I)

in which
A is a bivalent bonding group,
R is a divalent hydrocarbon radical, optionally containing a heteroatom, having 1 to 12 carbon atoms, and
X, Y, Z are $C_1$ to $C_8$ alkyl, $C_1$ to $C_8$ alkoxy, or $C_1$ to $C_8$ acyloxy residues, at least one of the residues being a $C_1$ to $C_8$ alkoxy or $C_1$ to $C_8$ acyloxy residue or group, and
n is 0 or 1.

A "bivalent" bonding group A is understood in this context as a divalent chemical group that links the polymer skeleton of the alkoxy- and/or acyloxysilane-terminated polymer to residue R of the terminal group. The divalent bonding group A can be formed, for example, in the context of manufacture of the alkoxy- and/or acyloxysilane-terminated polymer, for example as a urethane group by the reaction between a polyether functionalized with hydroxy groups, and an isocyanato-functional alkoxysilane.

"Isocyanatofunctional alkoxysilanes" are understood as short-chain monomeric compounds having a terminal silyl group as defined above, which contain an isocyanate function (—NCO) at at least one further site in the molecule. Alkoxysilane-terminated prepolymers can be obtained by reactions between polymers that contain H-acid groups (e.g. hydroxy or amino groups) and isocyanatofunctional alkoxysilanes.

Variable n is 0 or 1, i.e. the divalent bonding group A links the polymer backbone to residue R (n=1), or the polymer skeleton is connected or linked directly to residue R (n=0).

Residue R is a divalent hydrocarbon radical, optionally containing a heteroatom, having 1 to 12 carbon atoms. Oxygen (O) or nitrogen (N) can, for example, be contained as a heteroatom. The hydrocarbon residue can be, for example, a straight-chain or branched or cyclic, substituted or unsubstituted alkylene residue. The hydrocarbon radical can be saturated or unsaturated.

X, Y, and Z are, mutually independently, $C_1$ to $C_8$ alkyl, $C_1$ to $C_8$ alkoxy, or $C_1$ to $C_8$ acyloxy residues. At least one of the residues X, Y, Z must be a hydrolyzable group, i.e. a $C_1$ to $C_8$ alkoxy group or a $C_1$ to $C_8$ acyloxy group. Alkoxy groups, in particular methoxy or ethoxy groups, are by preference selected as hydrolyzable groups. This is advantageous because compositions containing alkoxy groups do not, upon curing, release any substances that irritate the mucous membranes. The alcohols that are formed are harmless in the quantities released, and evaporate. Acyloxy groups, for example an acetoxy group —O—CO—$CH_3$, can, however, also be used as hydrolyzable groups.

According to a preferred embodiment, the alkoxy- and/or acyloxysilane-terminated polymer comprises at least two terminal groups of the general formula (I). Each polymer chain thus contains at least two linking sites at which condensation of the polymers can take place in the presence of atmospheric moisture, with release of the hydrolyzed residues. In addition, the configuration of the achievable network can be controlled by way of the quantity and structure of the hydrolyzable groups (e.g. use of di- or trialkoxysilyl groups, methoxy groups, or longer residues, etc.), so that not only the reactivity but also the elasticity, flexibility, and high-temperature strength, among other characteristics, of the completely crosslinked compositions can thereby be influenced.

An embodiment in which X, Y, and Z are a methyl group or a methoxy group is particularly preferred. Compounds having alkoxysilyl groups have different levels of reactivity in the context of chemical reactions, depending on the nature of the alkyl residues on the oxygen atom. Among the alkoxy groups, the methoxy group exhibits the greatest reactivity. Silyl groups of this kind can thus be resorted to when particularly rapid curing is desired. Higher aliphatic residues, such as ethoxy, already produce a lower reactivity in the terminal alkoxysilyl group as compared with methoxy groups, and can be used advantageously to implement graduated crosslinking rates.

In a further preferred embodiment, R is a hydrocarbon residue having 1 to 6 carbon atoms, in particular having 1 to 3 carbon atoms. The curing rate of the composition can be influenced by way of the length of the hydrocarbon residues that form the bonding member between the polymer skeleton and silyl residue, thereby offering a further capability for configuring the silane-crosslinking adhesive according to the present invention.

R is, in particular, a methylene, ethylene, or propylene residue. Methylene and 1,3-propylene residues are used with particular preference. Alkoxysilane-terminated compounds having a methylene group as a bonding member to the polymer skeleton (so-called ←silanes) exhibit particularly high reactivity in the terminating silyl group, which results in shortened setting times and thus very rapid curing of formulations based on such polymers.

In general, a lengthening of the connecting hydrocarbon chain results in decreased reactivity of the polymers. The ©-silanes in particular, which contain the unbranched propylene residue as a bonding member, exhibit a balanced relationship between necessary reactivity (acceptable curing times) and delayed curing (open time, possibility for correction once bonding has occurred).

According to a further preferred embodiment, A is an amide, carbamate, urea, imino, carboxylate, carbamoyl, amidino, carbonate, sulfonate, or sulfinate group, or an oxygen or nitrogen atom. The bonding group A can be formed in the context of manufacture of the silyl-terminated polymers, by reacting the skeleton polymer with a reactive component that carries the —R—SiXYZ sequence. Group A can be both distinguishable and indistinguishable from structural features occurring in the underlying polymer skeleton. The latter case exists, for example, when it is identical to the linkage points of the repeating units of the polymer skeleton. In this case n would correspond to a value of 0. If bonding group A is distinguishable from the linkage groups in the polymer skeleton, n corresponds to a value of 1.

Several methods are described in the existing art for linking a reactive silyl group to a polymer skeleton. One that may be mentioned is polymerization of unsaturated monomers with ones that, for example, comprise alkoxysilyl groups. One monomer of the latter kind suitable for this would be, for example, vinyltrimethoxysilane. A further method is grafting of unsaturated monomers, such as e.g. vinyltrimethoxysilane, onto thermoplastics, for example onto polyethylene. Also widely utilized is hydrosilylation, the addition of silanes resp. H-silanes, such as e.g. methyldimethoxysilane, to carbon-carbon double bonds with noble-metal catalysis. This method causes the residue containing the terminal silyl group to be linked directly, i.e. without a further bonding group, to the polymeric backbone (n=0 in formula (I)).

Urethane and urea groups, which can be obtained by reacting specific functional groups of a prepolymer with an organosilane that carries a further functional group, are particularly preferred as a bonding group. Urethane groups can be produced, for example, either when the polymer skeleton contains terminal hydroxyl groups and when isocyanatofunctional alkoxysilanes (also referred to as isocyanatosilanes) are used as a further component, or when, conversely, a polymer that comprises terminal isocyanate groups is reacted with an alkoxysilane containing terminal hydroxy groups (hydroxfunctional alkoxysilane). Urea groups can be obtained in similar fashion when a terminal primary or secondary amino group (on either the silane or the polymer), which reacts with a terminal isocyanate group present in the respective reaction partner, is used. This means that a reaction is brought about either between an aminofunctional alkoxysilane (aminosilane) and a polymer comprising terminal isocyanate groups, or between an isocyanatofunctional alkoxysilane and a polymer terminally substituted with an amino group.

Urethane groups and urea groups advantageously increase the strength of the polymer chains and of the entire crosslinked polymer, since they can form hydrogen bonds.

According to a particularly preferred embodiment, the alkoxy- and/or acyloxysilane-terminated polymer has a polyether or polyurethane backbone, and bonding group A is a urethane group or urea group, the alkoxy- and/or acyloxysilane-terminated polymer preferably comprising two terminal groups of the general formula (I) that possess di- or trimethoxysilyl residues, for example di- or trimethoxysilylpropyl residues, or di- or trimethoxysilylmethyl residues.

In a further preferred embodiment, the alkoxy- and/or acyloxysilane-terminated polymer has a molecular weight $M_n$ from 4000 to 60,000, by preference from 8000 to 20,000.

Two-component systems can also be formulated on the basis of reactive, silane-functional binding agents. Because crosslinking of these binding agents takes place by polycondensation, however, and not, as in the case of the polyurethanes, by polyaddition, a broad spectrum of reaction partners is not available in this case. Water is instead used as a general rule as a reaction partner in such systems. The first component is thus made up of a formulation similar to that of a one-component adhesive. The second component contains water as a reactive constituent, the water being contained in sufficient quantity to hydrolyze the alkoxysilyl groups and/or acyloxylsilyl groups contained in the first component. Products of this kind are known to one skilled in the art and are commercially obtainable.

Further details regarding the adhesive according to the present invention:

The adhesive according to the present invention is notable for the fact that in a cured state at a temperature at least in the range from −10 to +50° C., it has a dynamic mechanical loss factor tan δ of at least 0.4, by preference at least 0.5, at a frequency in the range from 10 to 400 Hz. What this means is that the aforesaid minimum values of tan δ are attained at least at a temperature and at least at a frequency in the respectively recited ranges. The temperature on the one hand, and the frequency on the other hand, at which the maximum value of tan δ is respectively obtained vary depending on the composition of the adhesive. This is indicated in more detail in the Examples.

Polymer b) preferably represents a block copolymer. Those block copolymers that contain both an aromatic polymer block and an aliphatic polymer block are preferred. The aromatic polymer block can be, for example, a polystyrene block. The aliphatic polymer block can be, for example, a polybutadiene block or a polyisoprene block. Block copolymers having an (aromatic polymer block—aliphatic polymer block—aromatic polymer block) structure are particularly preferred. Styrene-isoprene-styrene (SIS) block copolymers are particularly suitable for this. Of these in turn, those SIS copolymers that have a styrene content in the range from approximately 18 to approximately 25 wt % are preferred.

SIS block copolymers of this kind are obtainable, for example, under the commercial name Hybrar™ of Kururay Europe GmbH. The isoprene block in this context can be entirely or partly hydrogenated, with the result that the number of carbon-carbon double bonds originally present is decreased, and the thermal stability of the block copolymer is thereby increased.

Further suitable block copolymers are (the name of the monomer denoting in each case a polymer block made of that monomer): styrene-butadiene-styrene, styrene-ethylene-propylene-styrene, styrene-ethylene-butadiene-styrene; in the case of butadiene blocks, the remaining double bonds can likewise be entirely or partly hydrogenated.

In order to produce the best possible vibration damping under ambient conditions, it is preferred that the glass transition temperature (measured by means of DSC) of component b) be in the region of ambient temperature. In temperate latitudes this is, for most of the year, a temperature in a range from approximately −10° C. to approximately 30° C. Those polymers b) that have a glass transition temperature (measured by DSC) in that temperature range are therefore preferred.

Polymer b) either can be dispersed heterogeneously in the form of particles in binding agent a), or it can be distributed homogeneously therein, the latter in particular when a polymer b) as a homogeneous mixture with high-boiling solvents, oils, or plasticizers is used. In order to avoid fogging problems due to evaporating solvent, oil, or plasticizer, these adjuvants are to have, as pure substances at standard pressure, a respective boiling point of at least 150° C., by preference at least 200° C., and in particular at least 250° C.

If polymer b) is present heterogeneously in the form of particles, the latter must on the one hand not be too large, so as not to interfere with the applicability of the adhesive. On the other hand, they should also not be too small, so that with the requisite weight proportion of polymer b) in the adhesive, there are not too many individual particles that can prevent formation of the network of binding agent a) and thus weaken the adhesive bond. It is therefore preferred that the particles of polymer b) have a size distribution such that at least 80 wt % of the particles have a size, determinable by sieve analysis, in the range from 1 µm to 500 µm, preferably in the range from 50 µm to 300 µm. If the commercial form of polymer b) is made up of larger particles (e.g. a granulate), they must be milled to the preferred particle size. Because the particles are elastic at room temperature, this is preferably accomplished using cryogenic methods at low temperature, e.g. using liquid nitrogen.

Even when polymer b) is present in the adhesive in the form of particles, it is advantageous that the formulation additionally contains one or more high-boiling solvents, oils, or plasticizers as an additive. In order to reduce or eliminate fogging, these are to exhibit, as pure substances at standard pressure, a boiling point of at least 150° C., preferably at least 200° C., and in particular at least 250° C. Those substances or mixtures that possess good compatibility with polymer b), and thereby allow swelling of the particles, are particularly suitable in this context. This represents an approach partway toward the second recited embodiment, in which the mixtures of polymer b) with the aforementioned additives that are used are homogeneous from the outset.

Suitable as additives for the SIS copolymers that are particularly preferred as polymer b) are, for example, high-boiling naphthas, mineral oils, or process oils that are made up of different proportions of paraffinic, naphthenic, and aromatic hydrocarbons. Such products are obtainable from various manufacturers under commercial names such as Enerpar™, Enerthene™ (BP AG), Catenex™, Edelex™, Gravex™ (Shell AG), or Nytex™ and Nyflex™ (Nynas Naphthenics AB). Olefin-containing products are also usable.

With the aid of these additives, on the one hand the acoustic damping effect of the adhesive can be further enhanced. On the other hand, the mechanical strength is also increased, presumably as a result of better incorporation of the polymer particles into the binding agent system. The fact that both adhesive properties can be improved simultaneously, even though they otherwise behave counterproductively to one another, is a particular advantage of the aforesaid additives.

Depending on the solvent, oil, or plasticizer additive that is selected, the glass transition temperature of polymer b) can also be shifted, and optimum adaptation to the desired utilization range of the adhesive can be achieved.

The total quantity of added high-boiling solvents, oils, or plasticizers is equal to between 1 wt % and 50 wt %, by preference between 5 wt % and 30 wt %, particularly preferably between 10 wt % and 20 wt %.

In the second embodiment recited above, polymer b) is added to the adhesive not in powder form, but instead in the form of a mixture with high-boiling solvents, oils, and/or plasticizers. Such mixtures have the advantage that they can be melted at comparative low temperature, by preference not above 100° C. This makes possible simpler handling of polymer b), by preference an SIS copolymer, as a liquid component, and homogeneous incorporation into the adhesive is facilitated. Formulations that contain meltable mixtures of this kind are moreover notable for a high initial strength ("green strength"): the adhesive is processed at a corresponding temperature and exhibits upon cooling—depending on the quantity of polymer b) mixture used—a vigorous viscosity buildup to the point of solidification. The result is that the joined parts are quickly immobilized, similarly to a melt adhesive.

Examples of the aforesaid high-boiling solvents, oils, and/or plasticizers have already been listed above. The same substances as in the case of the first embodiment, in which powdered polymer b) is utilized, can be used with advantage.

The adhesive optionally contains, in particular as a constituent of a mixture of polymer b) with high-boiling solvents, oils, or plasticizers, at least one further component that possesses a glass transition temperature Tg above that of polymer b). This on the one hand allows compensation for the decrease in the Tg value due to the high-boiling substances; on the other hand, the Tg can be very effectively adjusted, and the preferred utilization temperature of the adhesive can be adapted, by way of the quantitative ratio of the components. An additional advantage of the mixtures is the wider tan δ peak as compared with pure polymers b), for example SIS copolymers. The temperature range in which a good damping effect results is thereby broadened.

Suitable additional components are resins or polymers which can be mixed homogeneously with polymer b), for example with an SIS copolymer, and with the high-boiling substances used, and whose glass transition temperature Tg is above that of polymer b). The softening temperature of the additional components should, if possible, not exceed that of polymer b), but instead is preferably lower than it. Specific hydrocarbon resins that are otherwise typically used as tackifiers in adhesive formulations have proven to be suitable.

The adhesive therefore preferably contains, in addition to components a) and b) and a high-boiling solvent, oil, or plasticizer, a further polymer or resin, by preference a hydrocarbon resin, that has a glass transition temperature (measured by means of DSC) that is at least 10° C. higher than that of polymer b), but is equal to at least 0° C., by preference at least 30° C., and at most 120° C., by preference at most 70° C.

Suitable representatives may be found, for example, under the commercial name Escorez™ of Exxon Mobil Chemical, for example Escorez™ 2184, which has a softening point of 98° C. and a glass transition temperature, determinable by DSC, of 47° C.

It is particularly preferred in this context that the glass transition temperature, measured by DSC, of polymer b) be in the range from −10 to +30° C., and that of the aforesaid further polymer or resin be in the range from +30 to +70° C. This results in a particularly broad maximum for the temperature dependence of tan δ in the region of normal ambient temperatures of vehicles. This means that at a given frequency, values of tan δ that are above the desirable threshold value of 0.4 are achieved over a wider temperature range. The desired damping behavior is thus achieved over an expanded temperature range.

In order to achieve this desired improvement in tan δ, it is preferred that the adhesive contain 1 to 50 wt %, by preference 5 to 35 wt %, and very particularly preferably 10 to 25 wt %, based on the total mass of the adhesive, of the aforesaid further polymer or resin.

Particularly favorable mechanical properties of the cured adhesive are achieved when component a) contains or represents a binding agent based on polytetrahydrofuran. What is meant thereby is that binding agent a) contains chains of polytetrahydrofuran that comprise, at their ends, reactive isocyanate terminal groups or silane terminal groups. Terminal groups of this kind can be generated by reacting poly-THF polyols with a stoichiometric excess of diisocyanate (see Example 2) or with an excess of a silane that comprises groups reactive with respect to alcohol groups. This yields prepolymers, based on poly-THF, that comprise at the chain ends unreacted, reactive isocyanate groups or silane groups. It is preferred in this context that the adhesive contain, based on its total mass, at least 10 wt %, by preference at least 20 wt %, but no more than 90 wt %, by preference no more than 50 wt %, polytetrahydrofuran components. The positive properties of this component in terms of the strength of the cured adhesive become particularly evident when the adhesive contains unsaturated SIS block copolymers as component b).

Particularly high strength values are achieved when the portions of high-boiling solvents, oils, or plasticizers optionally contained in the formulation are also replaced, entirely or partly, by a non-crosslinking polyurethane oligomer based on polytetrahydrofuran. This oligomer preferably has a number-average molecular weight in the range from 500 to 5000 g/mol. Its proportion by weight in the complete adhesive is by preference at least 5, in particular at least 10 wt %, but preferably no more than 50, in particular no more than 30 wt %.

Consideration must be given, however, to the fact that as a result of this action, the previously discussed advantages of high-boiling additives in the area of acoustic damping are once again lost. In addition, the use of a polyurethane oligomer that must be manufactured separately, instead of a commercial product, is unattractive in terms of cost.

The quantitative proportion of the binding agent having reactive isocyanate terminal groups or silane terminal groups in the overall adhesive is by preference at least 10 wt %, in particular at least 30 wt %, but by preference at most 90 wt %, in particular at most 50 wt %.

The quantitative proportion of the nonreactive polymer b) in the overall adhesive is by preference at least 5 wt %, in particular at least 10 wt %, but by preference at most 60 wt %, in particular at most 40 wt %.

As is evident from the above, the adhesive can additionally contain solvents, oils, and/or plasticizers as well as a further polymer or resin having the glass transition temperature features described earlier. The adhesive can furthermore also contain other components usual in the intended area of application, such as fillers, adhesion promoters, stabilizers, catalysts, pigments, and others.

In addition to the high-boiling mineral oils or process oils described as particularly advantageous, the adhesive can contain typical plasticizers such as dialkyl phthalates, dialkyl adipates, dialkyl sebacates, dialkyl maleates, alkylene dibenzoates, trialkyl and triaryl phosphates, trialkyl citrates, trialkyl mellitates, or alkylsulfonic acid esters of phenol. Specific examples are e.g. diisononyl phthalate, diisodecyl phthalate, di(2-ethylhexyl) adipate, di(2-ethylhexyl)sebacate, di(2-ethylhexyl)maleate, dipropylene glycol dibenzoate, tricresyl phosphate, triisononyl trimellitate or Mesamoll (Bayer AG).

Examples of fillers are the various milled or precipitated chalks, carbon black, pyrogenic silicic acid, titanium dioxide, calcium magnesium carbonates, barite, and silicate fillers, e.g. wollastonite, chlorite, mica, talc, or kaolin. Especially for use in one-component moisture-hardening adhesives, these fillers are dried before use by way of suitable methods known to one skilled in the art, in order to prevent premature gelling or curing of the products.

Carbon black, in particular dry ink carbon black, is preferably used as a pigment. Pyrogenic silicic acids, castor oil derivatives, or ureas can be used, for example, alongside carbon black in order to adjust the rheological properties.

Examples of catalysts for curing the adhesive are tin salts and in particular organic tin compounds. Typical representatives are dialkyltin carboxylates, the alkyl residue preferably having a carbon chain length from 2 to 8, and the carboxylate anion by preference representing an anion of a fatty acid having 8 to 18 carbon atoms. Specific examples are dibutyltin dilaurate (DBTL), dibutyltin diacetate, or dioctyltin dilaurate.

Tertiary amines are also often used as catalysts. Dimorpholinodiethyl ethers (DMDEE), for example, is suitable for one-component polyurethane systems. Triethylenediamine, tetramethylethyldiamine, 1,4-diazabicyclooctane (DABCO), or 1,8-diazabicyclo(5.4.0)-undecene-7 (DBU) are used, for example, for two-component polyurethane adhesives.

The adhesives according to the present invention are preferably applied at an elevated temperature between approx. 50° C. and 100° C. and, as a result of a viscosity increase upon cooling to ambient temperature, achieve sufficient initial strength to immobilize the parts to be bonded. It is also possible, however, to formulate adhesives that can be applied at room temperature. After adhesive application, hardening of the one-component systems occurs by reaction with atmospheric moisture, and that of the two-component systems by reaction of the reaction partners from the two components.

The Claims refer, in the case of a two-component formulation, to that composition which exists after mixture of the two components.

The adhesive according to the present invention is utilized preferably for adhesive bonding of components in the context of the manufacture or repair of vehicles. It is suitable in particular for bonding in windows in the context of direct glass bonding. This can relate on the one hand to original equipment when a vehicle is first manufactured, and on the other hand to the replacement of windows for repair purposes. The transfer of vibrations between the window and the vehicle body is considerably reduced as a result of the adhesive according to the present invention that is used, thereby damping the noise level in the interior of the vehicle.

Lastly, the present invention relates to a vehicle, in particular a train car, a bus, a truck, a piece of equipment such as, for example, an excavator or a bulldozer, and in particular a passenger car, in which at least one window has been adhesively bonded in using an adhesive according to the present invention.

EXAMPLES

Example 1

Manufacturing a Polyurethane Prepolymer

With moisture excluded, 785.0 g polypropylene ether triol having an average molecular weight of 6000 g/mol, 1.5 g toluenesulfonyl isocyanate, and 58.0 g diisononyl phthalate were made ready in a reaction vessel. 115.0 g melted diphenylmethane-4,4'-diisocyanate (MDI) was mixed in, and a solution of 0.02 g tin(II) ethylhexanoate in 19.98 g diisononyl phthalate was then added. Stirring was performed under vacuum for 1 hour at 80° C. 0.5 g benzoyl chloride in 20.0 g diisononyl phthalate was then added and mixed in. The resulting prepolymer was decanted into moisture-tight drums, and had an isocyanate content of 2.2%.

Example 2

Manufacturing a Polyurethane Prepolymer

With moisture excluded, a mixture of 832.0 g poly-THF diol having an average molecular weight of 2000 g/mol (Poly-THF 2000, BASF AG) and 168.0 g diphenylmethane-4,4'-diisocyanate (MDI) was stirred in a reaction vessel for 1 hour at 100° C. The resulting prepolymer was decanted into moisture-tight drums, and had an isocyanate content of 2.1%.

Example 3

Manufacturing a Polyurethane Oligomer
(Non-Crosslinking)

With moisture excluded, 686.6 g poly-THF diol having an average molecular weight of 2000 g/mol (Poly-THF 2000, BASF AG) and 1.5 g toluenesulfonyl isocyanate were made ready in a reaction vessel at 60° C. 188.9 g melted diphenylmethane-4,4'-diisocyanate (MDI) was then mixed in, and a solution of 0.02 g tin(II) ethylhexanoate in 19.98 g diisononyl phthalate was then added. The mixture was stirred for 1 hour at 80° C. under vacuum. After venting of the reaction vessel with dry nitrogen, 82.5 g n-hexanol was added, and stirring continued under standard pressure for 1 hour at 80° C. Lastly, 0.5 g benzoyl chloride in 20 g diisononyl phthalate was added and mixed in. The resulting product was decanted into moisture-tight drums, and had an isocyanate content of less than 0.1%.

Example 4

Manufacturing an SIS Copolymer Powder

A granulated styrene-isoprene-styrene block copolymer with a 21% styrene concentration and Tg=7° C. (Hybrar™ 5127, Kuraray Europe GmbH) was ground to a powder with the aid of liquid nitrogen. It exhibited the following particle size distribution: 0.3 to 0.5 mm: 4.5%; 0.1 to 0.3 mm: 83.1%; 0.063 to 0.1 mm: 11.8%; <0.063 mm: 0.6%.

Before being used, the powder was in each case dried under vacuum at 60° C. for 24 hours.

Example 5

Manufacturing Mixtures Containing SIS Copolymer

The raw materials listed were homogenized in a vessel at 130° C. with moisture excluded, and then decanted into moisture-tight drums:

Mixture 5.1:

| | |
|---|---|
| 333.3 g | styrene-isoprene-styrene block copolymer with 21% styrene concentration and Tg = 7° C. (Hybrar™ 5127, Kuraray Europe GmbH) |
| 476.2 g | hydrocarbon resin with softening point of 98° C. and Tg = 47° C. (Escorez™ 2184, Exxon Mobil Chemical) |
| 190.5 g | high-boiling paraffinic-naphthenic oil (Catenex™ S 920, Shell AG) |

Mixture 5.2:

| | |
|---|---|
| 322.0 g | styrene-isoprene-styrene block copolymer with 21% styrene concentration and Tg = 7° C. (Hybrar™ 5127, Kuraray Europe GmbH) |
| 440.7 g | hydrocarbon resin with softening point of 98° C. and Tg = 47° C. (Escorez™ 2184, Exxon Mobil Chemical) |
| 237.3 g | high-boiling paraffinic-naphthenic oil (Catenex™ S 920, Shell AG) |

Example 6

Manufacturing a One-Component Adhesive

The following components were thoroughly mixed in a planetary mixer with moisture excluded, and processed to a homogeneous paste:

| | |
|---|---|
| 361.0 g | PUR polymer from Example 1 |
| 400.0 g | SIS copolymer powder from Example 4 |
| 100.0 g | ink carbon black, dry |
| 138.5 g | diisononyl phthalate |
| 0.5 g | dibutyltin dilaurate |

The adhesive was decanted into moisture-tight aluminum cartridges. The material was heated to 100° C. for processing.

Example 7

Manufacturing a One-Component Adhesive

The following components were thoroughly mixed in a planetary mixer with moisture excluded, and processed to a homogeneous paste:

| | |
|---|---|
| 361.0 g | PUR prepolymer from Example 1 |
| 400.0 g | SIS copolymer powder from Example 4 |
| 100.0 g | ink carbon black, dry |
| 138.5 g | high-boiling paraffinic-naphthenic oil (Nytex™ 840, Nynas Napht. AB) |
| 0.5 g | dibutyltin dilaurate |

The adhesive was decanted into moisture-tight aluminum cartridges. The material was heated to 100° C. for processing.

Example 8

Manufacturing a One-Component Adhesive

The following components were thoroughly mixed in a planetary mixer with moisture excluded, and processed to a homogeneous paste:

| | |
|---|---|
| 361.0 g | PUR prepolymer from Example 1 |
| 400.0 g | SIS copolymer powder from Example 4 |
| 100.0 g | ink carbon black, dry |
| 138.5 g | high-boiling paraffinic-naphthenic oil (Gravex ™ 973, Shell AG) |
| 0.5 g | dibutyltin dilaurate |

The adhesive was decanted into moisture-tight aluminum cartridges. The material was heated to 100° C. for processing.

Example 9

Manufacturing a One-Component Adhesive

The following components were thoroughly mixed in a planetary mixer with moisture excluded, and processed to a homogeneous paste:

| | |
|---|---|
| 303.0 g | PUR prepolymer from Example 2 |
| 30.0 g | hexamethylene diisocyanate trimerizate (Desmodur ™ N 3600, Bayer Mat. Sci.) |
| 400.0 g | SIS copolymer powder from Example 4 |
| 100.0 g | ink carbon black, dry |
| 166.5 g | diisononyl phthalate |
| 0.5 g | dibutyltin dilaurate |

The adhesive was decanted into moisture-tight aluminum cartridges. The material was heated to 100° C. for processing.

Example 10

Manufacturing a One-Component Adhesive

The following components were thoroughly mixed in a planetary mixer with moisture excluded, and processed to a homogeneous paste:

| | |
|---|---|
| 303.0 g | PUR prepolymer from Example 2 |
| 22.0 g | diphenylmethane-4,4'-diisocyanate oligomer mixture (Desmodur ™ VKS 70, Bayer Mat. Sci.) |
| 400.0 g | SIS copolymer powder from Example 4 |
| 100.0 g | ink carbon black, dry |
| 174.5 g | PUR oligomer from Example 3 |
| 0.5 g | dibutyltin dilaurate |

The adhesive was decanted into moisture-tight aluminum cartridges. The material was heated to 100° C. for processing.

Example 11

Manufacturing a One-Component Adhesive

The following components were thoroughly mixed in a planetary mixer with moisture excluded, and processed to a homogeneous paste:

| | |
|---|---|
| 349.5 g | PUR prepolymer from Example 2 |
| 30.0 g | hexamethylene diisocyanate trimerizate (Desmodur ™ N 3600, Bayer Mat. Sci.) |
| 420.0 g | mixture 5.1 from Example 5 |
| 159.5.0 g | ink carbon black, dry |
| 33.6 g | barium sulfate, dry |
| 6.4 g | 3-glycidyloxypropyltrimethoxysilane |
| 1.0 g | dibutyltin dilaurate |

The adhesive was decanted into moisture-tight aluminum cartridges. The material was heated to 100° C. for processing.

Example 12

Manufacturing a Two-Component Adhesive

Component A:
The following components were thoroughly mixed in a planetary mixer at 100° C. with moisture excluded, and processed to a homogeneous paste:

| | |
|---|---|
| 540.0 g | Mixture 5.2 from Example 5 |
| 235.2 g | polybutadiene diol (MW = 2800 g/mol; Liquiflex ™ H of Petroflex) |
| 64.8 g | castor oil |
| 160.0 g | ink carbon black, dry. |

The component was decanted into moisture-tight aluminum cartridges.
Component B:
The following components were thoroughly mixed in a planetary mixer with moisture excluded, and processed to a homogeneous paste:

| | |
|---|---|
| 750.0 g | diphenylmethane-4,4'-diisocyanate oligomer mixture (Desmodur ™ VK 10, Bayer Mat. Sci.) |
| 250.0 g | ink carbon black, dry |

The component was decanted into moisture-tight aluminum cartridges.
Mixing the Adhesive:
In a cartridge mixer with a spiral agitator, 10 parts by weight component A and 1 part by weight component B were thoroughly mixed for 2 minutes at 100° C. under vacuum. The completed adhesive mixture was then immediately processed.

Example 13

Manufacturing a One-Component Adhesive

Comparative Example without SIS Copolymer

The following components were thoroughly mixed in a planetary mixer with moisture excluded, and processed to a homogeneous paste:

| | |
|---|---|
| 410.0 g | prepolymer from Example 1 |
| 195.0 g | ink carbon black, dried |
| 195.0 g | milled chalk, dried |

-continued

| 199.5 g | diisononyl phthalate |
|---|---|
| 0.5 g | dibutyltin dilaurate |

The adhesive was decanted into moisture-tight aluminum cartridges. The material was heated to 60° C. for processing.
Tests:
The following tests were carried out with the adhesives of Examples 6 to 13:
1. Shore A hardness per DIN 53505
2. Tensile strength, elongation at fracture, and modulus of elasticity per DIN 53504
3. Tensile shear strength analogous to DIN EN 1465, using 100×25×6 mm glass/glass test specimens (overlap: 25×10×5 mm). A commercially usual glass primer (Terostat™ 8517 H, Henkel AG & Co. KGaA) was used to improve adhesion.
4. Grub peel test per DIN 54457 on float-glass panels. A commercially usual glass primer (Terostat™ 8517 H, Henkel AG & Co. KGaA) was used to improve adhesion.
The fracture pattern was evaluated in accordance with DIN EN ISO 10365.
5. Dynamic mechanical loss factor tan δ in the frequency range 1 to 400 Hz, using a DMA instrument (DMA+100, 01 db Metravib). The values were determined in expansion-compression mode using a dynamic deformation of 0.05%.
The geometry of the test specimens was 20×10×5 (width× height×depth).
A waiting period of 14 days in a standard climate (23° C., 50% RH) was observed between manufacture of the test specimens and performance of the test, in order to ensure complete curing of the adhesive.
The results are summarized in Table 1. By way of example, and for reasons of clarity, only the values for the 400 Hz frequency are provided for the loss factor.

by Examples 9 to 11, the result of the introduction of poly-THF prepolymer and, in particular, additionally poly-THF oligomer (Ex. 10) is that substantially higher tensile and tensile shear strength values than in Example 6 are reached.

It is particularly advantageous to replace phthalate plasticizers with paraffinic-naphthenic oils: as is apparent from a comparison of Examples 7 and 8 with Example 6, the result here is not only an improved level of strength but additionally a much higher tan δ maximum. Example 12 shows (with a less-optimized formulation) that the technology according to the present invention is also applicable to two-component systems.

FIG. 1 shows the temperature dependence of the loss factor tan δ at 400 Hz for the adhesives of Examples 6, 7, 11, and 13. The greater damping effect of adhesives 6, 7, and 11 with respect to the comparative Example 13 in the room-temperature range is evident. It is clearly apparent that example 7 (with paraffinic-naphthenic oil instead of diisononyl phthalate) has a particularly advantageous peak height. Example 11 (with a ternary mixture of SIS copolymer, paraffinic-naphthenic oil, and hydrocarbon resin) shows an improved peak width.

The invention claimed is:

1. A one- or two-component adhesive comprising:
   a) a binding agent having reactive isocyanate groups;
   b) a nonreactive polymer comprising unsaturated SIS block copolymers; and
   c) a further polymer or resin selected from non-crosslinking polyurethane oligomers.

2. The adhesive according to claim 1, wherein
   b) the nonreactive polymer has a glass transition temperature, measured by means of DSC, in a range from −40° C. to +60° C.

TABLE 1

Test results with adhesive formulations of Examples 6 to 13

| | | Example | | | | | | | |
|---|---|---|---|---|---|---|---|---|---|
| Test | | 6 | 7 | 8 | 9 | 10 | 11 | 12 | 13 (comp.) |
| Shore A hardness (DIN 53505) | | 45 | 43 | 44 | 62 | 56 | 46 | 52 | 57 |
| Tensile strength (DIN 53504), MPa | | 3.6 | 5.2 | 6.2 | 7.3 | 13.1 | 7.2 | 3.7 | 9.5 |
| Elongation at fracture (DIN 53504), % | | 440 | 590 | 610 | 350 | 490 | 430 | 190 | 460 |
| E-modulus at 100% elongation (DIN 53504), MPa | | 1.2 | 1.0 | 1.1 | 2.9 | 3.2 | 2.3 | 2.0 | 2.7 |
| Tensile shear strength (analogous to DIN EN 1465), MPa | | 2.5 | 3.0 | 3.3 | 3.8 | 4.3 | 3.4 | 2.5 | 5.0 |
| Grub peel test on glass (DIN 54457), % coh. failure | | 100 | 100 | 100 | 100 | 70 | 100 | 100 | 100 |
| tan δ at 400 Hz | Temp. of peak maximum | 12° C. | 14° C. | 9° C. | 23° C. | 31° C. | 22° C. | 14° C. | no peak |
| | Peak max. | 0.60 | 0.82 | 0.78 | 0.59 | 0.50 | 0.57 | 0.55 | — |
| | Value at 20° C. | 0.55 | 0.78 | 0.64 | 0.58 | 0.40 | 0.57 | 0.53 | 0.17 |

As is evident from Table 1, the adhesives according to the present invention of Examples 6 to 12 exhibit much higher tan δ values, and thus better damping properties, than the standard adhesive from comparative Example 13. A comparison of Examples 6 and 13 shows that the tensile strength and tensile shear strength are considerably reduced by the introduction of the SIS copolymer (and the decrease in carbon black content). This disadvantage can be compensated for by using other types of prepolymer and/or plasticizer: as shown 3. The adhesive according to claim 1, wherein, in a cured state, at a temperature at least in a range from −10 to +50° C., said adhesive has a dynamic mechanical loss factor tan δ of at least 0.4 at a frequency in a range from 10 to 400 Hz.

4. The adhesive according to claim 1, wherein said adhesive further comprises at least one additive selected from solvents, oils, and plasticizers and combinations thereof, each of said solvents, oils and plasticizers as pure substances at standard pressure, having a boiling point of at least 150° C.

5. The adhesive according to claim 4, wherein b) is part of a liquid component comprising the at least one additive and is distributed homogeneously in binding agent a).

6. The adhesive according to claim 4, wherein said adhesive contains between 1 wt % and 50 wt %, based on total mass of the adhesive, of said additive.

7. The adhesive according to claim 4, wherein the adhesive further comprises a hydrocarbon resin having a glass transition temperature, measured by means of DSC, that is at least 10° C. higher than the glass transition temperature of polymer b), but is equal to at least 0° C.

8. The adhesive according to claim 1, wherein said binding agent a) comprises a binding agent based on polytetrahydrofuran in an amount of at least 10 wt % and not more than 50 wt % based on total mass of the adhesive.

9. The adhesive according to claim 1, wherein c) the non-crosslinking polyurethane oligomers include a non-crosslinking oligomer based on polytetrahydrofuran in a proportion by weight based on total mass of the adhesive of at least 5 wt % and not more than 50 wt %.

10. The adhesive according to claim 9, wherein said binding agent a) comprises a binding agent based on polytetrahydrofuran in an amount of at least 10 wt % and not more than 50 wt % based on total mass of the adhesive; and said component b) comprises unsaturated SIS block copolymers having a styrene content in a range from 18 to 25 wt %.

11. The adhesive according to claim 1, wherein said adhesive contains, based on total mass of the adhesive, at least 10 wt % and at most 90 wt % binding agent a).

12. The adhesive according to claim 1, wherein said adhesive contains, based on total mass of the adhesive, at least 5 wt % and at most 60 wt % of polymer b).

13. The adhesive according to claim 1 wherein said adhesive further comprises solvents, oils, plasticizers and combinations thereof, in an amount of 10 wt % and 20 wt %, based on total mass of the adhesive, each of said solvents, oils and plasticizers as pure substances at standard pressure, having a boiling point of at least 250° C.

14. The adhesive according to claim 1, wherein b) is dispersed heterogeneously as particles in binding agent a), said particles having a size distribution such that at least 80 wt % of the particles have a size ranging from 50 μm to 300 μm.

15. The adhesive according to claim 1, wherein a) the binding agent having reactive isocyanate groups comprises polyurethane prepolymers.

16. The adhesive according to claim 1, wherein b) the unsaturated SIS block copolymers comprise at least one unsaturated styrene-isoprene-styrene block copolymer having a styrene content in a range from 18 to 25 wt %.

17. The adhesive according to claim 1, wherein c) the non-crosslinking polyurethane oligomer is based on polytetrahydrofuran and has a number-average molecular weight ranging from 500 to 5000 g/mol.

* * * * *